(12) United States Patent
Hunter

(10) Patent No.: US 7,877,454 B1
(45) Date of Patent: Jan. 25, 2011

(54) ELECTRONIC MESSAGING

(76) Inventor: Shane Horan Hunter, 13104 Dressage La., San Diego, CA (US) 92130

( * ) Notice: Subject to any disclaimer, the term of this patent is extended or adjusted under 35 U.S.C. 154(b) by 112 days.

(21) Appl. No.: 12/187,265

(22) Filed: Aug. 6, 2008

Related U.S. Application Data

(60) Provisional application No. 60/954,092, filed on Aug. 6, 2007.

(51) Int. Cl.
*G06F 15/16* (2006.01)
(52) U.S. Cl. .................... 709/207; 709/206
(58) Field of Classification Search ........... 709/206, 709/207
See application file for complete search history.

(56) References Cited

U.S. PATENT DOCUMENTS

| | | | |
|---|---|---|---|
| 6,938,065 B2* | 8/2005 | Jain | 709/201 |
| 7,529,940 B1* | 5/2009 | Winkel et al. | 713/170 |
| 7,555,526 B1* | 6/2009 | Heidloff et al. | 709/206 |
| 2003/0101227 A1* | 5/2003 | Fink | 709/207 |
| 2004/0148356 A1* | 7/2004 | Bishop et al. | 709/206 |
| 2005/0204009 A1* | 9/2005 | Hazarika et al. | 709/206 |
| 2007/0005717 A1* | 1/2007 | LeVasseur et al. | 709/206 |
| 2007/0112927 A1* | 5/2007 | Jung | 709/206 |
| 2007/0250585 A1* | 10/2007 | Ly et al. | 709/206 |
| 2007/0294357 A1* | 12/2007 | Antoine | 709/206 |
| 2008/0162651 A1* | 7/2008 | Madnani | 709/206 |
| 2009/0214034 A1* | 8/2009 | Mehrotra et al. | 380/255 |

* cited by examiner

*Primary Examiner*—Michael Won

(57) ABSTRACT

Methods of producing and sending an e-message include receiving addressee instructions from a sender for a single sender e-message indicating addresses of first and second intended destinations of at least portions of content of the single sender e-message; associating a first content portion of the single e-message with the first intended destination, the first content portion being intended to be received by the first intended destination; and sending the first content portion toward the first intended destination in a destination e-message such that the first content portion is accessible at the first intended destination and is inhibited from being accessed at the second intended destination.

18 Claims, 15 Drawing Sheets

ELECTRONIC MESSAGING

CROSS-REFERENCES TO RELATED APPLICATIONS

This application claims the benefit of U.S. Provisional Application Ser. No. 60/954,092 filed Aug. 6, 2007, which is incorporated herein in its entirety

BACKGROUND

Electronic messaging is incredibly common in today's society. Tens of millions, if not hundreds of millions or even billions, of electronic messages are transmitted every day. Examples of electronic messages, or e-messages, include e-mails, text messages, and instant messages. E-mails typically involve a person or other entity addressing the email to one or more persons, providing some text to be seen by the addressee(s), possibly attaching documents such as text documents, pictures, spreadsheets, etc., and sending the message to the addressee(s) via a network such at the global, packet-switched communications network known as the Internet. Other examples of networks includes local area networks (LANs), wide area networks (WANs), and wireless networks such as cellular networks and satellite networks. Networks may be combinations of the noted networks, and other networks can also be used alone or in combination with those mentioned.

SUMMARY

Exemplary methods of producing and sending an e-message include receiving addressee instructions from a sender for a single sender e-message indicating addresses of first and second intended destinations of at least portions of content of the single sender e-message; associating a first content portion of the single e-message with the first intended destination, the first content portion being intended to be received by the first intended destination; and sending the first content portion toward the first intended destination in a destination e-message such that the first content portion is accessible at the first intended destination and is inhibited from being accessed at the second intended destination.

Embodiments of such methods of producing and sending an e-message may include one or more of the following features. Sending the first content includes sending the first content portion toward the first intended destination but not toward the second intended destination. Receiving the addressee instructions includes receiving the addressee instructions via a packet-switched telecommunications network. Methods may further include receiving a second content portion to be delivered to each of the first and second intended destinations; and sending the second content portion toward the first and second intended destinations; where the second content portion is sent in conjunction with the first content portion toward the first intended destination in the destination e-message. Methods may further include displaying an additional-content indicator at the first intended destination; and displaying the first content portion at the first intended destination only if a user of the first intended destination selects to have the first content portion displayed. The additional-content indicator is displayed at a location, on a display, selected by the sender relative to the first content. Methods may further include displaying the first content portion on a display such that the first content portion is visually distinct from the second content portion. The first content portion is automatically displayed at the first intended destination without a user at the first intended destination having to select to have the first content portion displayed.

Embodiments of such methods of producing and sending an e-message may include one or more of the following features. Methods may further include automatically displaying the first content portion at the first intended destination such that the first content portion is visually distinct from second content portion. Methods may further include displaying the first content portion at the first intended destination in response to a cursor being moved over a region of the destination e-message indicating that additional information is associated with the region.

Exemplary computer program products configured to send electronic communications to multiple recipients, the computer program product residing on a computer readable medium, include computer readable instructions configured to cause a computer to: receive addressee instructions in a single outgoing e-message indicating addresses of intended recipients of the e-message; receive first content to be delivered to each of the intended recipients; associate second content with at least one selected intended recipient, of the intended recipients, to receive the second content in addition to the first content; and send the first content toward the intended recipients and send the second content such that the second content is accessible by the at least one selected intended recipient and is inhibited from being accessed by the intended recipients other than the at least one selected recipient.

Embodiments of a such computer program products configured to send electronic communications to multiple recipients may include one or more of the following features. Computer program products may further include instructions configured to cause the computer to: receive an indication of the at least one selected intended recipient; and receive an indication of the second content. The instructions configured to cause the computer to send the first and second content are configured to cause the computer to send the second content only toward the at least one selected intended recipient. Computer program products may further include instructions configured to cause the computer to receive a location indication indicative of a selected location to display the second content relative to the first content, where the instructions configured to cause the computer to send the first and second content are configured to cause the computer to send the first and second content such that the second content will be displayed at the selected location.

Exemplary computer program products configured to send electronic communications to multiple recipients, the computer program product residing on a computer readable medium, include computer readable instructions configured to cause a computer to: receive addressee instructions in a single-view outgoing e-message indicating first and second addresses of first and second different intended recipients of first and second outgoing e-messages, respectively, the first and second outgoing e-messages being related to the single-view outgoing e-message; associate first and second information, respectively, with the first and second outgoing e-messages to be provided to the different intended recipients, the first and second information being different in addition to containing different addresses of the first and second outgoing e-messages, the first and second information being different in substantive content and/or a handling setting; and send the first outgoing e-message toward the first intended recipient and the second outgoing e-message toward the second intended recipient.

Embodiments of a such computer program products configured to send electronic communications to multiple recipients may include one or more of the following features. The instructions for causing the computer to associate the first and second information cause the computer to associate the different substantive content and/or handling setting with the first and second outgoing e-messages automatically in response to the first address and/or the second address. The substantive content comprises an attachment and the instructions configured to cause the computer to associate the first and second information cause the computer to associate a document with the first outgoing e-message and to associate a link to the document with the second outgoing e-message based on the first and second addresses. Computer program products may further include instructions configured to cause the computer to receive indications of the different substantive content and/or handling setting, wherein the instructions for causing the computer to associate the first and second information cause the computer to associate the different substantive content and/or handling setting with the first and second outgoing e-messages in response to the received indications of different substantive content and/or handling setting. The substantive content comprises text and the instructions configured to cause the computer to associate the first and second information cause the computer to associate first and second signature block information, different from each other, and/or first and second salutation block information, different from each other, with the first and second outgoing e-messages based on the first and second addresses. The handling setting comprises a priority and/or a read request and/or a cleaning level.

Exemplary embodiments of methods of producing and sending different e-messages to different recipients include receiving indications, via a single-view e-message interface of a single-view outgoing e-message, of first and second addresses of first and second different intended recipients of first and second outgoing e-messages, respectively, the first and second outgoing e-messages being related to the single-view outgoing e-message; associating first and second information, respectively, with the first and second outgoing e-messages to be provided to the different intended recipients, the first and second information being different in addition to containing different addresses of the first and second outgoing e-messages, the first and second information being different in substantive content and/or a handling setting; and sending the first outgoing e-message toward the first intended recipient and the second outgoing e-message toward the second intended recipient.

Embodiments of such methods of producing and sending different e-messages to different recipients may include one or more of the following features. The associating includes associating the different substantive content and/or handling setting with the first and second outgoing e-messages automatically in response to the first address and/or the second address. The substantive content includes an attachment. The associating includes associating a document with the first outgoing e-message and associating a link to the document with the second outgoing e-message based on the first and second addresses. Methods may further include receiving indications of the different substantive content and/or handling setting, where the associating the first and second information comprises associating the different substantive content and/or handling setting with the first and second outgoing e-messages in response to the received indications of different substantive content and/or handling setting. The substantive content includes text in a body of the e-message. The associating the first and second information includes associating first and second signature block information, different from each other, with the first and second outgoing e-messages based on the first and second addresses. The handling setting comprises a priority and/or a read request and/or a cleaning level.

Exemplary embodiments of an apparatus include: a user interface module configured to provide information for a user interface to prompt a user to enter primary e-message information into a single-view e-message for different recipients with different substantive content and/or handling settings, the user interface module being further configured to receive indications of the e-message information; a message processing module coupled to the user interface module and configured to receive the primary e-message information and to produce multiple secondary e-messages from the primary e-message information and to output the multiple secondary e-messages; and a network interface module coupled to the message processing module and configured to receive the multiple secondary e-messages from the message processing module and to send the multiple secondary e-messages to a communication network toward different recipients associated with the multiple secondary e-messages.

Embodiments of such apparatus may include one or more of the following features. The user interface module is configured to communicate with the communication network, to provide the information for the user interface to the network, and to receive the indications of the e-message information from the communication network. The message processing module is configured to selectively disable recipients of the secondary e-messages from at least one of printing, copying, or forwarding at least portions of the secondary e-messages respectively received.

Various aspects of apparatus and/or methods discussed in the disclosure may provide one or more of the following capabilities. Electronic messaging can be more flexible than with existing systems. Electronic messaging can be customized/tailored to individual recipients more than with existing messaging. Different text or other information can be provided to different electronic message. Some information can be provided to all addressees of an electronic message while other information is provided to less than all of the addressees. Limited-distribution information can be provided to recipients of an electronic message in conjunction with the message as opposed to through a separate electronic message. Different priorities may be set for different electronic message recipients. Different automatic custom information can be provided for different electronic message recipients. Storage used to store electronic messages can be reduced.

These and other capabilities will be more fully understood after a review of the following figures, detailed description, and claims.

DETAILED DESCRIPTION

Embodiments of the disclosure provide techniques for providing different information to different addressees of an e-message. For example, an e-message (e.g., email) system provides a user with an ability to provide a universal message such as text and also provide separate text or other information to any of the message recipients. Universal information need not be supplied, but if supplied, is supplied to all the message recipients. Thus, for further example, the user can enter a universal text message and/or attach one or more universal attachments, and can selectively provide limited-distribution text and/or attachments for any of the recipients such that, for example, copied, non-primary recipients can get limited-distribution text and/or attachments, blind copied, non-universal recipients can get limited-distribution text and/or attachments, and the limited-distribution text(s) and/or attachment(s) is(are) not viewable by those recipients not selected to receive or view the limited-distribution information. For example, the signature block and/or salutation block delivered to different recipients of an electronic message may be different, and may be automatically selected based upon the different recipients, e.g., their addresses. Also, different handling settings, such as priorities, cleaning levels, read requests, etc., may be different for different recipients. Other embodiments are within the scope of the disclosure.

Figure 1:
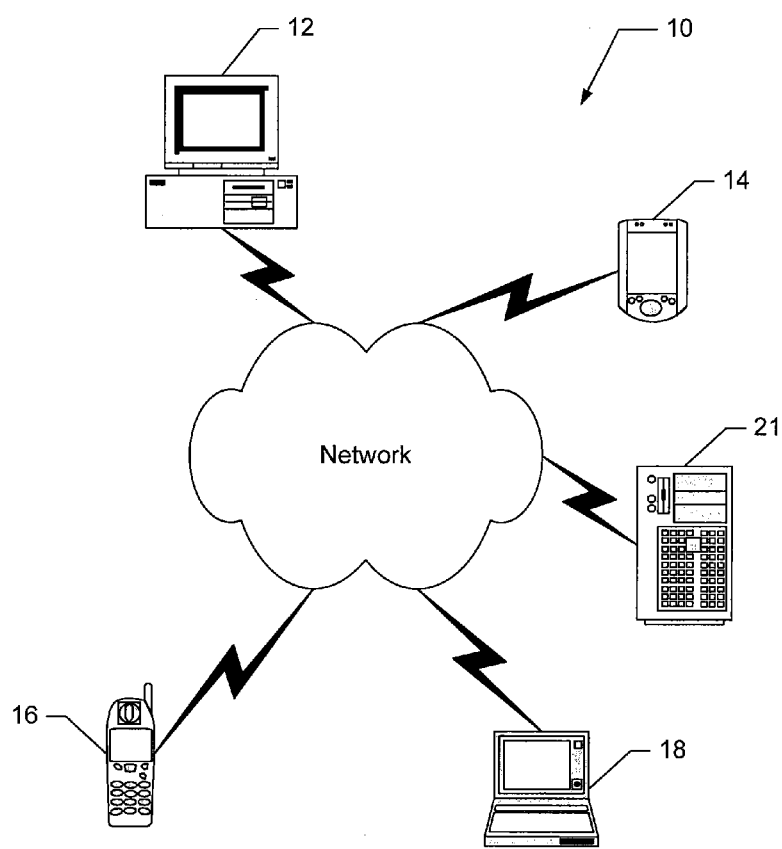
FIG. 1 is a diagram of electronic communication devices and an electronic communications network.

Referring also to FIG. 1, a communication system 10 includes electronic communication devices 12, 14, 16, 18, a communications network 20, and a server 21. The device 12 is shown as a desktop computer, the device 14 is shown as a personal data assistant (PDA), the device 16 is shown as a mobile phone, and the device 18 is shown as a laptop computer. These devices are exemplary only, and not limiting of the disclosure, as the devices 12, 14, 16, 18 may be these or other devices capable of electronic message transfer, such as mobile, wireless e-message devices such as BlackBerry® wireless e-message devices made by Research In Motion Limited (RIM)® of Waterloo, Ontario, Canada. The network 20 is an electronic communications network(s), such as the Internet, a WAN, a LAN, a wireless network (e.g., cellular network), etc., or combinations of such networks. The server 21 is configured to provide electronic messaging services. For example, users of the devices 12, 14, 16, 18 can use the devices 12, 14, 16, 18 to access an electronic messaging service program on the server 21 to produce, send, and receive electronic messages as described below. For example, the server 21 may enable a user to produce a single sender e-message from which different addressees receive different information, to inhibit addressees from printing, copying, forwarding, etc. some information received, or to effect other messaging features.

The devices 12, 14, 16, 18 and the server 21 are configured to send and receive e-messages such as emails. The devices 12, 14, 16, 18 and the server 21 include appropriate hardware (e.g., processors), and memory with stored computer program instructions for causing the hardware to perform desired functions to enable users of the devices 12, 14, 16, 18 to produce and send e-messages. The devices 12, 14, 16, 18 can also, or alternatively, be configured to interact through the network 20 with the server 21 to perform functions related to e-messages as described herein. The discussion below refers to the computer 12, but the other devices 14, 16, 18 can be configured with similar capabilities. The discussion below focuses on e-message capabilities provided locally by the computer 12, but some or all of the e-message capabilities discussed can be provided by the server 21 and accessed and used via the computer 12 and the network 20.

Figure 2:
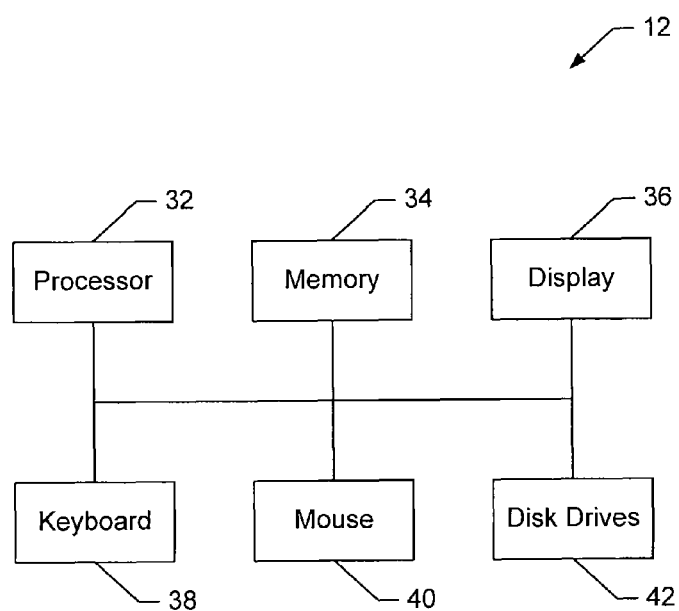
FIG. 2 is a block diagram of a computer shown in FIG. 1.

Referring to FIG. 2, the computer 12 includes a processor 32, memory 34 storing appropriate computer-readable software code, a display 36, a keyboard 38 and a mouse 40 for receiving user input, and disk drives 42 for reading from and writing to appropriate computer readable and/or writable disks. The disk drives 42 include a hard drive on which computer code may reside for causing the processor 32 to perform functions related to e-messages as described herein.

Figure 3:
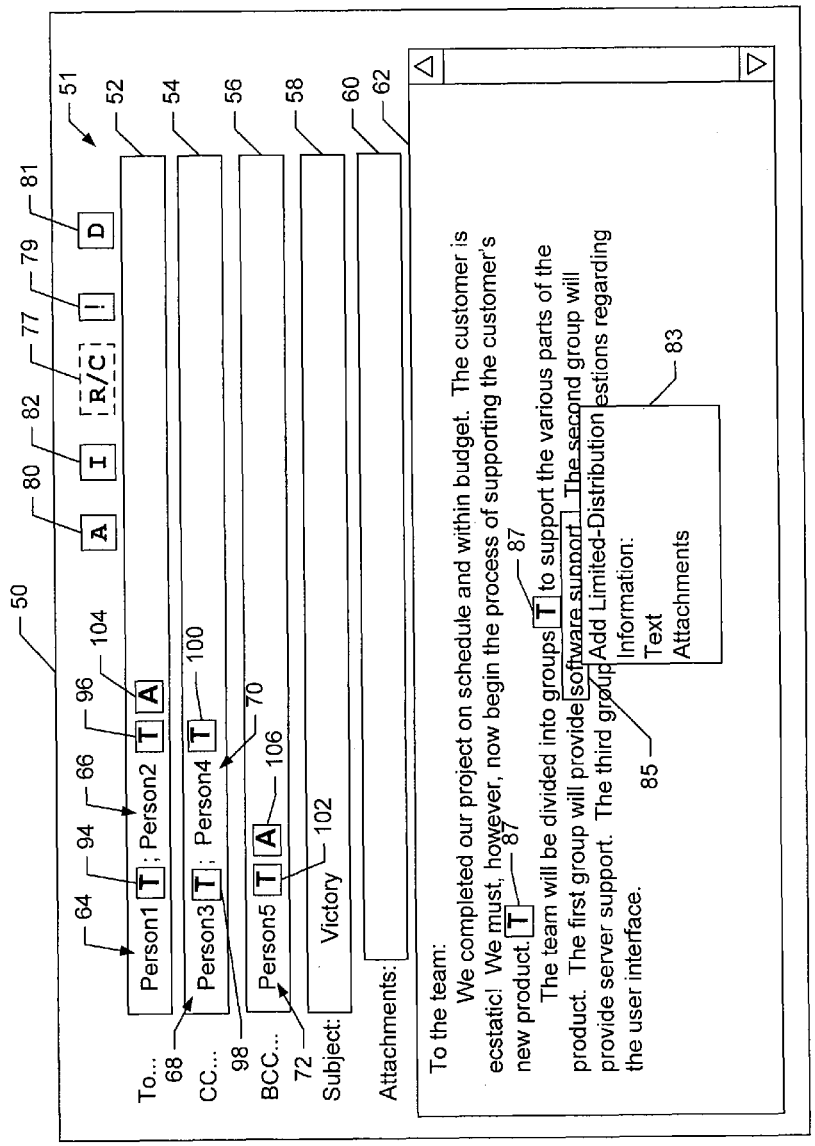
FIG. 3 is a simplified screenshot of an electronic message interface.

Referring also to FIG. 3, a screen display 50 provided by the computer 12 for sending an e-message 51 includes a "To" window 52, a "cc" window 54, a "bcc" window 56, a subject window 58, an attachment area 60, and a main text window 62. The To window 52 shows primary addressees (e.g., e-message addresses and/or screen names), here addressees 64, 66, for the e-message 51. The cc window 54 shows copy ("carbon copy") addressees, here addressees 68, 70, for the e-message 51. The bcc window 54 lists blind copy ("blind carbon copy") addressees, here a sole bcc addressee 72, for the e-message 51. Blind carbon copy addressees are not listed/visible to recipients of the e-message 51 (i.e., users of a device receiving the e-message). That is, the primary and cc recipient(s) of the e-message 51 can see the primary addressee(s) and the cc addressee(s), but not the bcc addressee(s). A bcc recipient may or may not be able to see other bcc addressees.

The computer 12 is configured to allow a user of the computer 12 to enter addressees, associate attachments with the e-message 51, provide subject information, and provide text, graphics, etc. for the e-message 51. The user can enter addressees in typical fashion, e.g., by typing appropriate addresses or selecting addresses from one or more menus. The addressees are placed in the appropriate window 52, 54, 56 by entering the information into the desired window 52, 54, 56, e.g., by selecting the appropriate window 52, 54, 56 using the mouse 40, or using the mouse 40 to select an addressee menu associated with the desired window 52, 54, 56, etc. Similarly, subject matter text may be entered in the subject window 58. The computer 12 allows the user to associate attachments with the e-message 51, e.g., by using the mouse 40 to select an attachment icon 80 (typically a paperclip icon) and typing in a desired document or manipulating one or more menus and selecting the desired document (e.g., a text document, graphics document, etc.). Indications, e.g., icons indicating the document type and text indicating the document name, of the attachments are displayed in the attachments area 60. The user can also enter text, graphics, or other information into the main text window 62, e.g., using the mouse 40 and/or the keyboard 38. The user need not enter information into the subject window 58 or the main text window 62.

The computer 12 is further configured to allow the sender/producer of the e-message 51 shown in the display 50 to select one or more of the addressees 64, 66, 68, 70, 72 to receive limited-distribution information. The limited-distribution information can be in lieu of or in addition to universal information such as text, graphics, and/or attachments. The limited-distribution information can be of various forms, e.g., text, attachments, etc. The limited-distribution information may be referred to as "additional" information, even though primary text, attachments, etc., may not be provided, e.g., if there is no information desired by the sender to be viewed by all recipients. The user can provide one or more text messages and/or one or more attachments to each of the selected ones of the addressees 64, 66, 68, 70, 72. The desired addressee(s) for receiving such limited-distribution information can be selected in a variety of ways. For example, an addressee may be selected by highlighting the addressee's displayed name and selecting the attachment icon 80, or by selecting a limited-distribution information icon 82, or by double clicking, using the mouse 40, on the addressee's displayed name, "right" clicking on the addressee's displayed name (i.e., placing the cursor over the displayed name and actuating the right mouse button (or left mouse button if the mouse 40 is configured for left-handed use) to activate a drop-down menu from which available attachments can be selected), etc. The addressees 64, 66, 68, 70, 72 can be selected individually for providing different limited-distribution information to different ones of the addressees 64, 66, 68, 70, 72. Also, multiple addressees can be selected to receive the same limited-distribution information, e.g., by holding down the SHIFT key or the CTRL key on the keyboard 38 while using the mouse 40 to click on multiple ones of the displayed addressee names, or selecting check boxes next to multiple addressees, etc.

The computer 12 is further configured to allow the sender/producer of the e-message shown in the display 50 to provide/select the limited-distribution information to be sent to the addressees 64, 66, 68, 70, 72 selected to receive limited-distribution information. Also, the selection of the addressees 64, 66, 68, 70, 72 may be concurrent with, or after, selection of the limited-distribution information. For example, referring also to FIG. 4, if the addressee 64 is selected for receiving limited-distribution information, a window 302 is displayed. The window 302 includes a display name(s) window 304, an e-message address(es) window 308, a text window 312, an attachments window 314, an attachment window menu icon 316, and a "remove all attachments," or "no attachments," (i.e., "without enclosures") check box 318. The display name (s) window 302 shows the display name(s) of the selected addressee(s), here the addressee 64. The e-message address (es) window 308 shows the e-message address(es) of the selected addressee(s), here the addressee 64. Which addressees to provide limited-distribution information to can be selected using a drop-down menu of display names by selecting a menu icon 306 or a menu of e-message addresses by selecting a menu icon 310. The text window 312 can be selected and the user can enter text, graphics, or other information into this window 312. Indications (e.g., file names and file extensions) of the selected attachment(s) are displayed in the attachments window 314. The user can select the menu icon 316 to activate a drop-down menu for browsing to find and select or de-select one or more attachments. The entered/selected text, attachments, etc., will be provided to the selected addressees and inhibited from being viewed (or even received) by non-selected addressees. Multiple windows 302 can be set for different groups of addressees with different limited-distribution information associated with each set. A "with enclosure" check box 320 can be selected so that the selected addressees receive all the attachments, e.g., if there is a default that no addressee will receive an attachment, or no addressee added after an attachment is selected will receive the attachment.

Attachments for addressees may be de-selected, either in advance, or after individual or universal selection. Preferably, if attachments are added using the attachment icon 80, any such attachments are presumed and defaulted to be sent to all addressees universally. Such universal attachments and any individually selected attachments, however, may be selectively removed from association with an addressee. For example, a user may individually select the limited-distribution icons for the addressees and remove one or more attachments associated with the selected addressee. Further, the user may select the "without enclosures" check box 318 to remove all currently selected attachments from association with the selected addressee(s) and inhibit further associations unless the check box 318 is de-selected, e.g., if a default is that addressees receive all attachments. While the check box 318 is selected for a particular addressee, preferably no attachments that are selected as universal attachments will be associated with the particular addressee.

The window 302 also provides the user with the ability to choose the form of attachments and/or the review/cleaning level for attachments. An attachment selection window 321 similar to the window 314 allows the user to choose from among the attachments selected using the window 314. Either of two check boxes 323, 325 can be selected by the user to choose whether the attachment(s) selected using the window 321 will be delivered as a document, or a link to the document (e.g., an Internet link, an intranet link to a location governed by document-management software such as Imanage®). An attachment selection window 327 similar to the window 321 allows the user to choose from among the attachments selected using the window 314. Any one of three check boxes 329, 331, 333 can be selected by the user to choose whether the attachment(s) selected using the window 327 will be reviewed/cleaned using a high, medium, or low level of review. The level of review is a handling setting and dictates what information will be removed from an attachment before sending (e.g., comments, redlining), e.g., by cleansing software such as Workshare® Protect made by Workshare Technology, Inc. of San Francisco, Calif. Recipients may have default document types and/or review levels associated with them.

Using the limited-distribution information window 302, the user can customize information provided to the addressees 64, 66, 68, 70, 72. For example, the user may provide text in the main text window 62 of the e-message, but also provide limited-distribution text to the bcc addressee 72. For example, the main text may contain an e-message string discussing a particular issue, and the limited-distribution text for the bcc addressee 72 could provide the user's opinion regarding the issue, or a request for action by the bcc addressee 72, or other information/messages such as "FYI." The limited-distribution information may even be critical of the content of the main text window 62 and/or one or more persons, including one or more of the addressees/recipients 64, 66, 68, 70, 72. For example, the limited-distribution text could be "Can you believe this?" or "Person3 is flat wrong!" While such information could be provided in existing systems by sending a separate, second e-message, embodiments of the disclosure allow e-message senders to do so in a "single-view" outgoing e-message prepared by the sender, that allows the user to produce different e-messages at once, sharing information common to the various e-messages.

Figure 5:
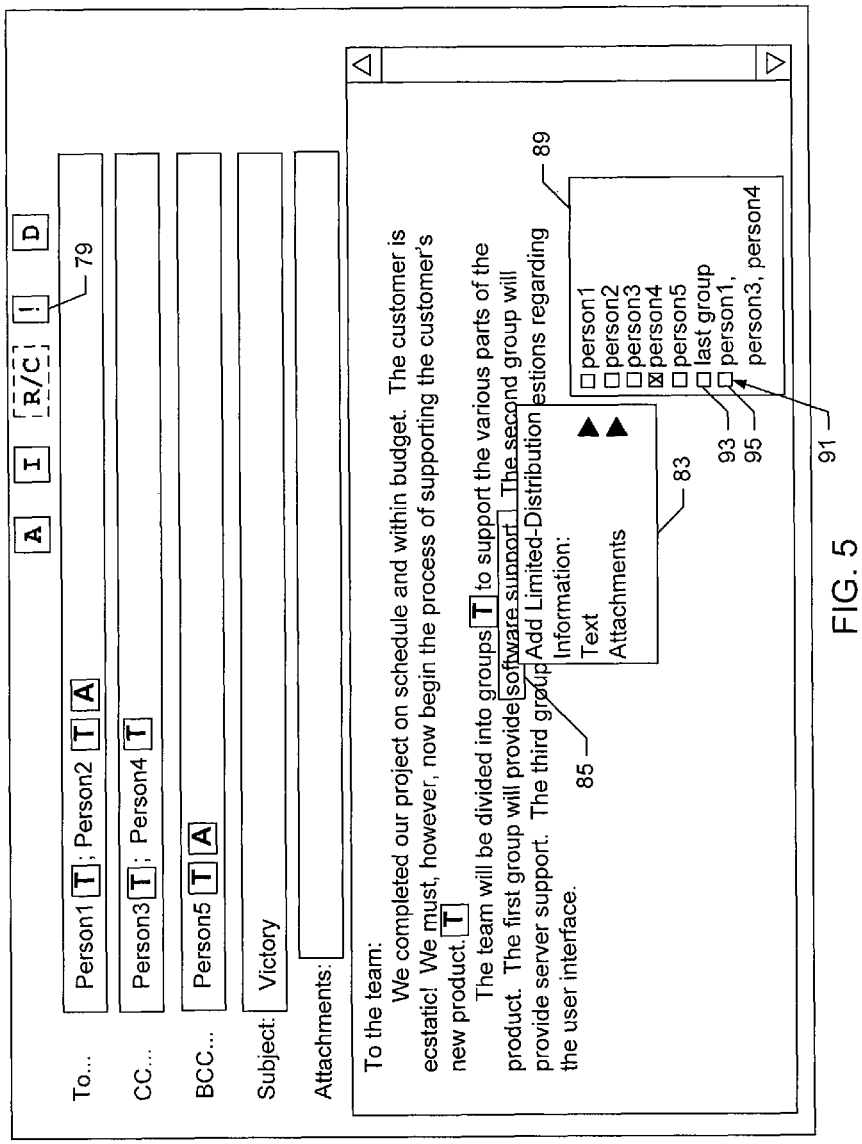
FIG. 5 is a simplified screenshot of an exemplary display of limited-distribution information at a recipient device.

The user can provide limited-distribution information in other manners. For example, in addition to selecting the limited-distribution information icon 82 and using the limited-distribution information window 302, the user can right click on a location in the primary information, or highlight a portion 85 of the primary information and right-click on it. In response, referring also to FIG. 5, the computer 12 can provide a menu 83 from which the user can select to add limited-distribution information associated with the selected location or highlighted information. The computer 12 is configured to respond to the selection to add limited-distribution information by prompting (e.g., by providing a text window) the user to enter or select limited-distribution information to be provided. The computer 12 is further configured to respond to the selection to add limited-distribution information by prompting the user to select the recipients of the limited-distribution information. For example, the computer 12 can provide a window 89 with indicia of the addressees 64, 66, 68, 70, 72 and in which the user can select the desired recipients. The user may select check boxes 91 adjacent each desired recipient. The window 89 also includes check boxes 93, 95 for selecting the last group selected, or another group of the addressees 64, 66, 68, 70, 72. The computer 12 can provide a limited-distribution information icon 87 at the location of the inserted limited-distribution information, or highlight the portion of the primary information to indicate that limited-distribution information is available and associated with that portion of the primary information. Other techniques for selecting the recipients or the location of limited-distribution information may be used.

Preferably, the device 12 is configured to send limited-distribution information only to the recipient for which the limited-distribution information is intended. Thus, a user of the device 12 can create what appears to the user to be a single e-message, providing any primary/universal information, attachments, etc., and any limited-distribution information, all in a single e-message, for which the user initiates delivery by actuating a "send" option once, and the device 12 is configured to send different e-messages to the recipients depending upon the limited-distribution information provided by the user. Thus, multiple recipients for which no limited-distribution information is provided will be sent the same e-message while each set of recipients for which the same set of limited-distribution information is provided will be sent an e-message that is the same for that set of recipients but that is different relative to recipients outside that set. This e-message would include any primary, common information (text, attachments, etc.) and the limited-distribution information designated for that set of recipients. Preferably, the sending user can view the multiple e-messages in the same form as the single e-message that the user created and sent by viewing the stored e-message in the user's "sent" box of the user's e-message program.

Further, the device 12 is configured to allow the user to select different handling settings in addition to review/cleaning level. For example, here the device 12 is configured to allow the user to select different priorities, different attachment review/cleaning levels, and different read request options, for different recipients of the e-message 51. The user can select the desired addressee(s) and actuate an icon 79 to set a priority selection, e.g., high priority, for the selected recipient(s). Alternatively, actuating the icon 79 could result in a menu of priority options being displayed (e.g., as a drop-down menu), from which a priority level, e.g., normal, high priority, low priority, etc., can be chosen for the selected recipient(s). Further, a delivery status icon 81 can be used in a similar manner to the icon 79 to choose delivery status settings, e.g., read notification, delivery notification, for the selected recipient(s).

Figure 6:
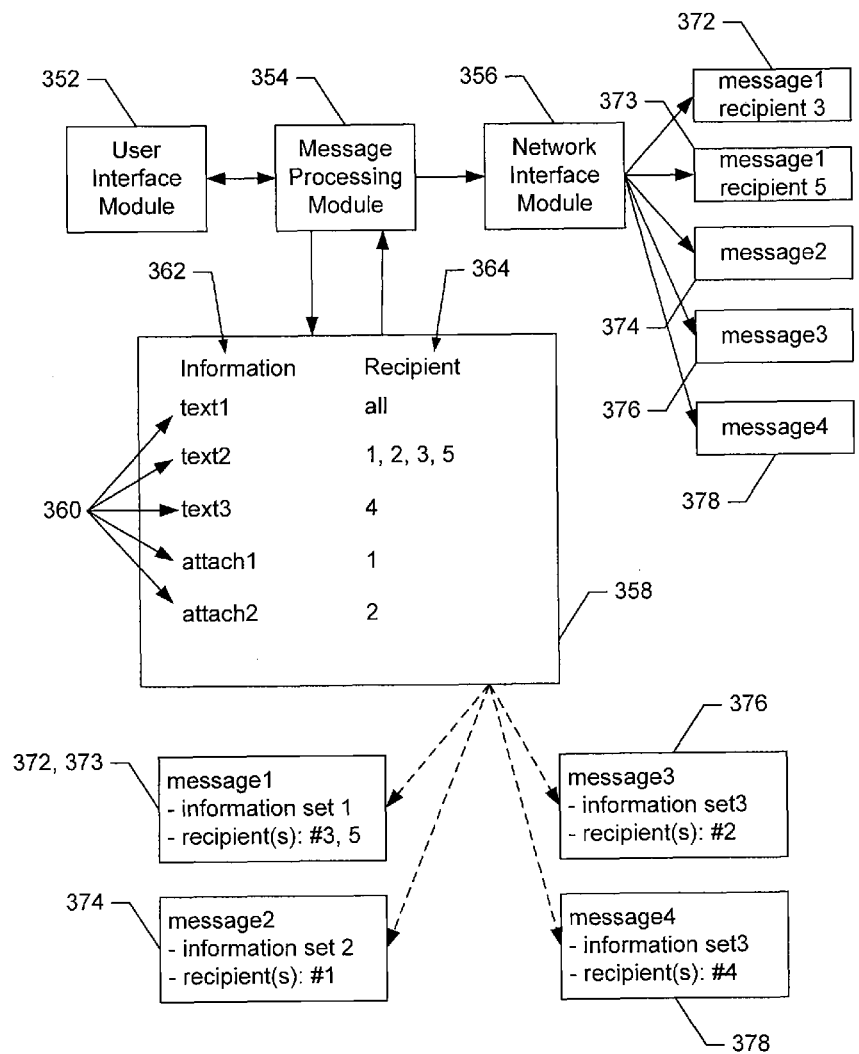
FIG. 6 is a block diagram of components for producing an electronic message with different information for different recipients and sending the electronic messages with different content to the recipients.

Referring also to FIG. 6, the computer 12 can provide a user interface module 352, a message processing module 354, a message output module 356, and a message storage area 358. The modules 352, 354, 356 are provided, at least partially, by the processor 32, the memory 34, and the display 36 and/or the keyboard 38 and/or the mouse 40, and the storage area 358 is a portion of the memory 34 and/or the disk drives 42. These modules 352, 354, 356, 358 are configured to receive information from the user, produce e-messages for addressees, and send (or provide access to, in the case of the server 21) the e-messages.

The user interface module 352 is configured to provide prompts to the user and receive information from the user, e.g., via the display 36 and/or the keyboard 38 and/or the mouse 40. Through the module 352, the computer 12 receives indications of universal information and limited-distribution information, and of which addressees are to receive which information.

The message processing module 354 is configured to process the indications regarding e-messages to store one or more e-messages in the module 358. The processing module 354 is configured to store e-message information in metadata in the module 358 in pairs 360 of information 362 and corresponding recipient(s) 364. The metadata reflects the content and corresponding recipients as selected by the sender of the e-message. The information stored in the log 358 corresponds to a single outgoing e-message as viewed by the sender. The information 362 is indicative of what information (e.g., text) is shown to the sender, where it is disposed, etc., while the recipient indications 364 associate the various information entries with who is to receive the corresponding information. The processing module 354 is configured to respond to an indication that limited-distribution information is to be provided, i.e., to less than all the addressees, by storing the limited-distribution information in a separate entry 360 and to associate the recipient(s) of the limited-distribution information with an appropriate list of intended recipients of that information. If the intended recipients of new limited-distribution information match those of an existing information/recipient pair, then the new limited-distribution information can be stored with the previously-stored information associated with that recipient list (e.g., attachment could include multiple attachments), or could be stored as a separate entry. As shown in FIG. 6, text1 is to be sent to all (here five) recipients of an e-message, text2 is to be sent to recipients 1, 2, 3, and 5 only, text3 is to be sent to recipient 4 only, attachment1 is to be sent to recipient 1 only, and attachment2 is to be sent to recipient 2 only.

The module 354 is configured to analyze the e-message information in the module 358 to produce multiple e-messages as appropriate. The module 354 can group the information entries 360 with common recipients to produce an e-message for each unique set of recipients. The module 354 is configured to provide the messages to the network interface module 356 for output to the network. In the example shown in FIG. 6, the module 354 will produce five e-messages 372, 373, 374, 376, 378. The messages 372, 373 will contain an information set 1 of text1 and text2 and will be addressed to recipients 3 and 5 only. The message 374 will contain an information set 2 of text1, text2, and attachment1 and will be addressed to recipient 1 only. The message 376 will contain an information set 3 of text1, text2, and attachment2 and will be addressed to recipient 2 only. The message 378 will contain an information set 4 of text1 and text3 and will be sent to recipient 4 only. The module 354 can show the sender the composite single e-message after sending as a sent e-message by analyzing the entries 360 and providing a single email indicating the limited-distribution information and the recipients of the various information in the e-message. Alternatively, once sent, the module 354 could show the sent e-messages as separate e-messages.

The message output module 356 is configured to send the e-messages 372, 373, 374, 376, 378 toward the addressees associated with each e-message. Indications of the recipients of the e-messages 372, 373, 374, 376, 378 along with indicia of the set of information received by each recipient may be provided. While five e-messages 372, 373, 374, 376, 378 are shown, other quantities of e-messages are possible. The module 356 is configured to respond to the user selecting to send the e-messages 372, 373, 374, 376, 378 by sending the e-messages 372, 373, 374, 376, 378 to the network 20 in accordance with the addresses of the addressees 64, 66, 68, 70, 72 (or other addressees as the case may be). In the case of the server 21 providing the e-message services, the module 356 would allow access to the appropriate e-message by the corresponding addressee and downloading of that message if desired. The message can be sent, e.g., to a web browser associated with the addressee instead of to an email application corresponding to the addressee. The output module 356 is configured to send the same message multiple times in the case of multiple addressees of a single message, e.g., to send the substantively identical messages 372, 373 to the addressees 64, 66, respectively.

Referring again to FIGS. 1 and 3, associated with the addressees 64, 66, 68, 70, 72 are limited-distribution text indicators and/or limited-distribution attachment indicators. Here, the addressees 64, 66, 68, 70, 72 each have limited-distribution text as indicated by text indicators 94, 96, 98, 100, 102. The addressees 66 and 72 have one or more limited-distribution attachments as indicated by the attachment indicators 104, 106. The indicators 94, 96, 98, 100, 102, 104, 106 can take a variety of forms, such as, as shown, boxes with letters indicative of the type of limited-distribution information, "T" for text and "A" for attachment. The indicators could include graphics, e.g., to indicate an attached document type, and/or text to indicate an attached document name and/or type. Preferably, text or attachment indicators are displayed only for addressees for which corresponding limited-distribution information exists. Alternatively, the indicators could always exist, and may appear differently when information is present (associated with the indicator(s)) versus not present (e.g., shadowed if no information is present and in solid lines/coloring if information is present). The indicators 94, 96, 98, 100, 102, 104, 106 indicate that one or more limited-distribution attachments or limited-distribution text messages are associated with the corresponding addressees. The limited-distribution text could be separate from any primary message, or could be associated with the primary message (e.g., the indicator could link or point to the limited-distribution text in the primary message). The indicators 94, 96, 98, 100, 102, 104, 106 here generically indicate that text or one or more attachments are provided for the corresponding recipients, but more detail could be provided. For example, the indicators 94, 96, 98, 100, 102, 104, 106 could indicate the particular limited-distribution information, e.g., by providing a file name associated with the limited-distribution information. Also, the limited-distribution information indicators 94, 96, 98, 100, 102, 104, 106 are preferably displayed in close proximity to the display name of the corresponding recipient 64, 66, 68, 70, 72.

Some or all of the limited-distribution information for one or more of the addressees 64, 66, 68, 70, 72 may be hidden from, and/or withheld from, one or more of the other addressees 64, 66, 68, 70, 72. The computer 12 is configured to allow the user to hide the existence of one or more pieces of limited-distribution information from (e.g., not to display to) one or more of the recipients 64, 66, 68, 70, 72. The existence of the limited-distribution information can be hidden, or information about the limited-distribution information, such as a file type or filename may be hidden.

The computer 12 is further configured such that, even if the existence of the limited-distribution information is not hidden, the user can hide some of the identifying information about the limited-distribution information. For example, the type of information (e.g., text vs. attachment) can be hidden, and/or the specific name of an attachment, and/or the attachment type (e.g., .doc, .pdf, .jpg, etc.) can be hidden. Further, although limited-distribution information is preferably not viewable by recipients that are not specifically selected to receive the limited-distribution information (and thus have a limited-distribution information indicator associated with their e-message addresses or screen names), different permissions may be given to allow such recipients to view the limited-distribution information (e.g., a boss may always have permission to view limited-distribution information sent to the employees reporting to that boss, or recipients of the same type (e.g., cc, bcc) may be permitted to view each other's limited-distribution information etc.), and/or its existence only, or its type but not content. In this way, further customizable secrecy is provided regarding informing the recipients of who can see what limited-distribution information. If multiple limited-distribution attachments are provided for a single addressee, a portion of the attachments can be hidden and/or identifying information of a portion of the attachments can be hidden from other addressees. If multiple limited-distribution texts and/or attachments are provided for a particular addressee, different permissions may be applied to different ones of the texts and/or attachments associated with the particular addressee such that different sets of other addressees may view different ones of the texts and/or attachments associated with the particular addressee. Preferably all information, including the limited-distribution information, regarding any bcc addressee is hidden from non-bcc addressees, and some or all information regarding bcc addressees can be hidden from other bcc addressees (e.g., existence of other bcc addressees, actual names of other bcc addressees, existence of limited-distribution information associated with a bcc addressee, the type or name or unique identifier of such limited-distribution information, etc.).

Figure 7:
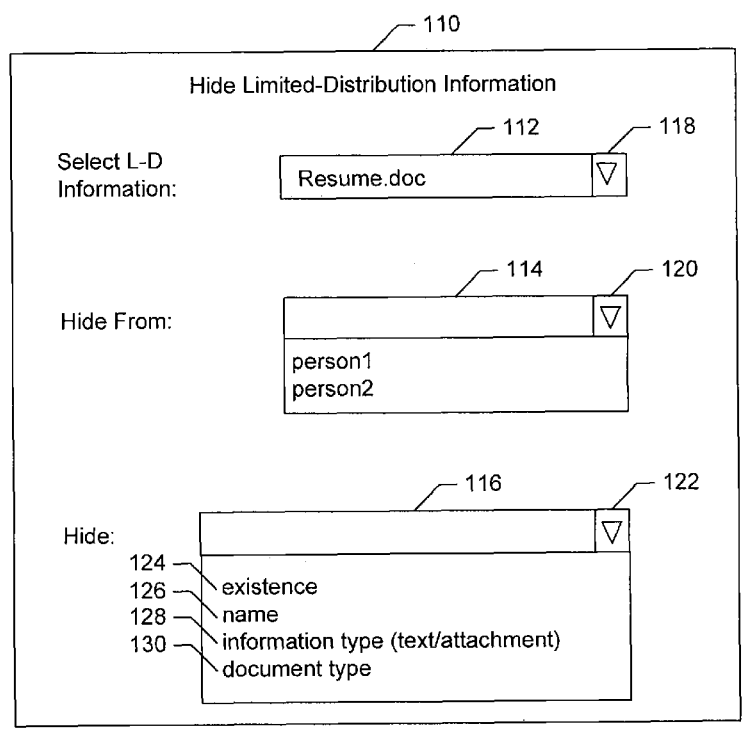
FIG. 7 is a simplified screenshot of a window for selective hiding of limited-distribution information from electronic message recipients.

The user can select which limited-distribution information's existence to show to (i.e., is not hidden from) which recipient and which limited-distribution information's identifying information to show to which recipient. Preferably, limited-distribution information is defaulted to being hidden, but the default could be to show the existence of the limited-distribution information. Choosing to show the existence of limited-distribution information can be accomplished in a variety of ways. In this example, the user can select one or more of the limited-distribution information indicators 94, 96, 98, 100, 102, 104, 106 to cause the computer 12 to display a hide limited-distribution information screen 110 as shown in FIG. 7. The screen 110 includes a selected limited-distribution information window 112, a hide from window 114, and a hide window 116. The selected limited-distribution information window 112 can be selected and the name of limited-distribution information entered, e.g., using the keyboard 38 (FIG. 2), or a drop-down menu button 118 can be actuated using the mouse 40 (FIG. 2) to browse available limited-distribution information. The hide from window 114 can be used to enter the addressee(s) from which to hide the information, or a drop-down menu button 120 can be actuated to browse and select the addressee(s). The hide window 116 can be used to enter the type of information associated with the selected limited-distribution information to hide. The type of information to hide may be entered in the window 116 or a drop-down menu button 122 may be selected to reveal the types of information that can be hidden. The types of information here are the existence 124 of the limited-distribution information, the name 126 of the limited-distribution information, the type (e.g., text vs. attachment) 128 of the limited-distribution information, and the document type (e.g., .doc, .jpg) 130 of a limited-distribution information document. One or more of the types of information to show can be selected using the mouse 40 and/or the shift button and/or the control button on the keyboard 38. The types of information are preferably defaulted to all be hidden.

Figure 8:
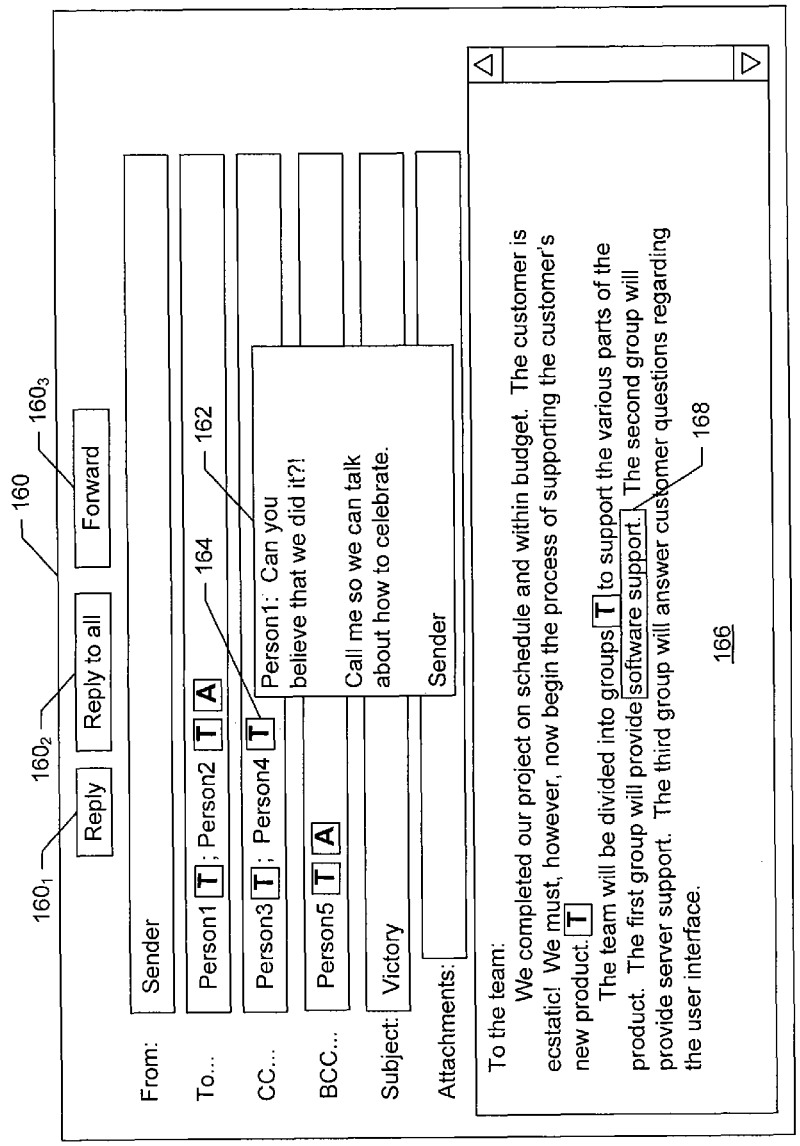
FIG. 8 is a simplified screenshot of another exemplary display of limited-distribution information at a recipient device, with selectors for replying to or forwarding a message.
Figure 9:
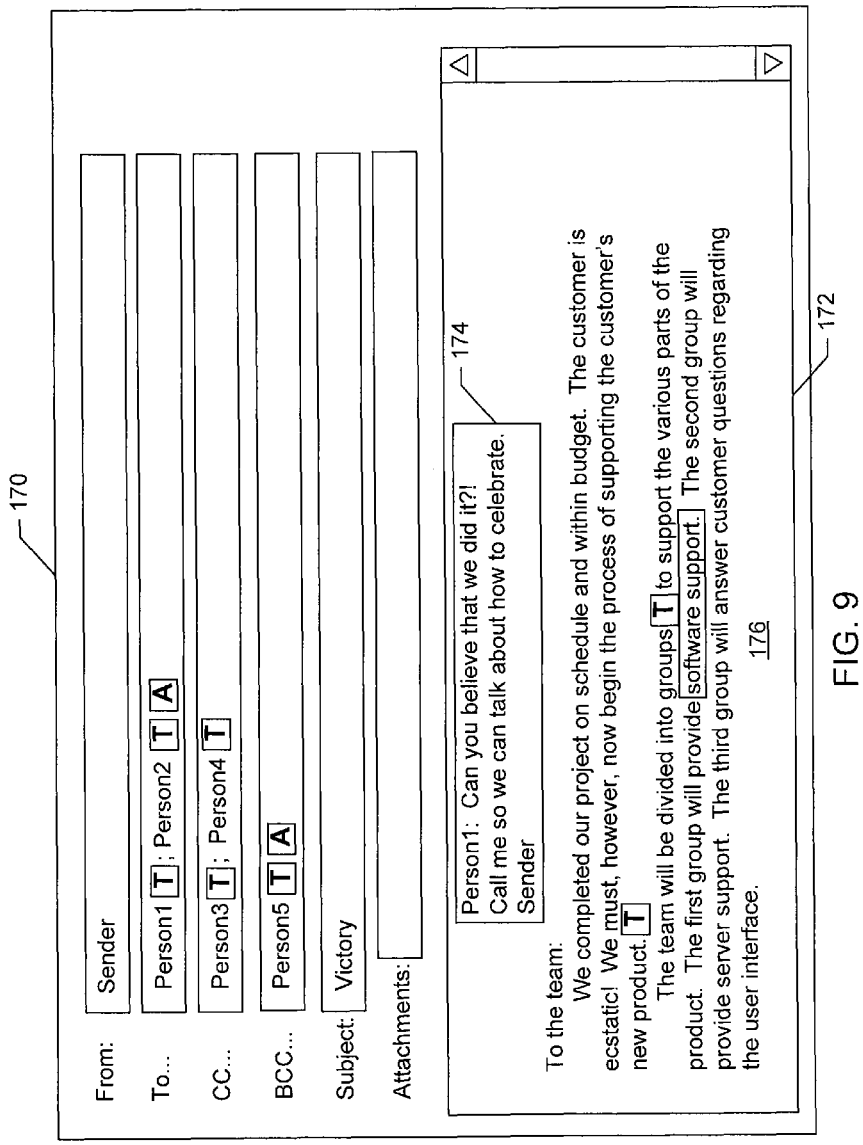
FIG. 9 is a simplified screenshot of an alternative electronic message interface showing limited-distribution information.

The limited-distribution information may be displayed by the sender's device or the recipient's device in a variety of ways. For example, the limited-distribution information indicators 94, 96, 98, 100, 102, 104, 106 may be selected to cause a separate window to be opened to show the corresponding information, e.g., a text document, a pdf document, etc. The opened window could occupy the entire screen of the user's device. Alternatively, as shown in FIG. 8, at the recipient's device such as the laptop 18 shown in FIG. 1, a small text window 162 can be opened that overlies upper portions of an e-message window 160 adjacent to a selected limited-distribution information indicator 164 while not overlying a main text portion 166 of the e-message window 160. Alternatively, the window 162 could be displayed in response to moving a cursor over the limited-distribution information indicator 164 (or a highlighted portion 168 of the universal information, which indicates the presence of limited-distribution information associated with the highlighted text) without requiring the user to further select (e.g., with a mouse click) the indicator 164. Alternatively, the window 162 could be displayed automatically, without requiring selection of the indicator 164 or passing the cursor over the indicator 164. Referring to FIG. 9, a limited-distribution text message 174 may be displayed in a main text window 172 of an e-message screen 170. The limited-distribution text message 174 is distinguished from main text 176 contained in the window 172. For example, the limited-distribution information could be put in a window or box, may be embedded in, or physically offset from, the universal information, displayed in a different color or font or style (e.g., capitals, italics, bold type, shaded background, or combinations of these techniques) than the main text 176, identified with name designations (e.g., "For Person1 Only:" or "For Person1 and Person3 Only:"), placed above or below or to the side of the main text 176, etc. Further, combinations of these techniques and/or using other techniques may be used.

Figure 10:
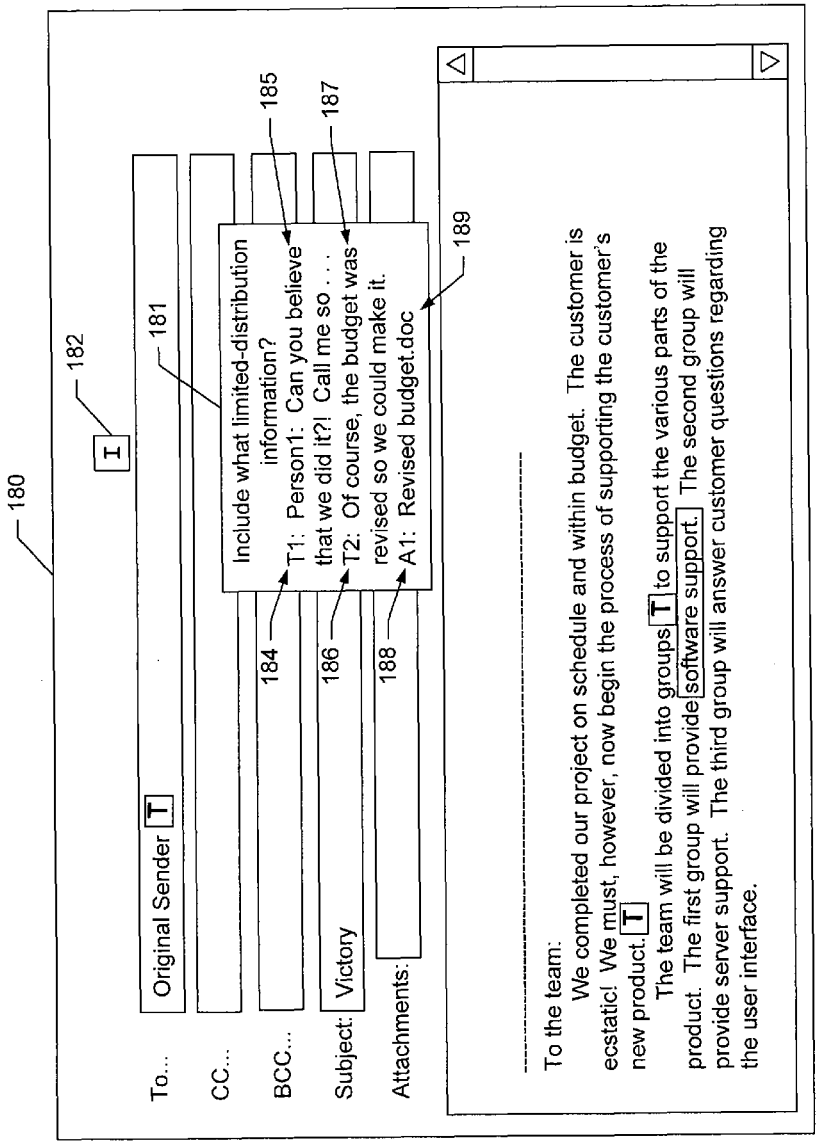
FIG. 10 is a simplified screenshot for selecting limited-distribution information to include in a forwarded or replied to electronic message.

Recipients can respond to a sender, or forward a received message, with received limited-distribution information. Referring again to FIG. 8, a recipient can select message processing button "reply" 161$_1$, "reply to all" 161$_2$, or "forward" 161$_3$. Alternative techniques may be used for selecting a reply or forward option, such as "right clicking" on the window 162 to actuate a response menu and selecting the desired reply or forward option from this menu. The recipient's device, e.g., the laptop 18 shown in FIG. 1, can query the user as to whether the user wishes to reply or forward the limited-distribution information along with the primary information, if any. Referring to FIG. 10, the user can be prompted in a message screen 180 with a separate window 181 that allows the user to select which pieces of limited-distribution information to include with the reply or forwarded message. The window 181 can be provided for selecting the limited-distribution information to include for all recipients of the reply or forwarded message, or, preferably, is displayed in response to selection of a recipient of the new message and selection of a limited-distribution information icon 182. The window 181 can provide indicia of the limited-distribution information, such as icons 184, 186, 188 as well as additional information 185, 187, 189 such as a file name, a portion of the limited-distribution information (e.g., beginning of a limited-distribution text message), etc. Alternatively, the user could select indicators of the desired limited-distribution information to include with a reply or forwarded message and then select the desired reply or forward option and the selected limited-distribution information would be included, or available for inclusion, with the reply or forwarded message. The user can also add original limited-distribution information to a reply or a forwarded message.

The recipient, however, may be inhibited, e.g., by the sender, from forwarding, copying, saving, and/or printing the limited-distribution information. The computer 12 is configured such that the user can select to inhibit forwarding, copying, saving, and/or printing of the limited-distribution information. The user can select to inhibit any of the actions completely, or can restrict them without completely barring them, e.g., allowing limited-distribution information to be sent to certain recipients (e.g., other recipients of the same limited-distribution information). The computer 12 is further configured to allow the user to have the computer 12 include instructions in the e-message to have the limited-distribution information be automatically removed (deleted or otherwise rendered inaccessible) by the recipient's device, e.g., after a set amount of time. For example, the user can select how much time to allow the limited-distribution information to be displayed or how much time to allow the limited-distribution information to be accessible after an initial display by the recipient's device. Alternatively, the recipient may be inhibited, by default, from forwarding, copying, saving, or printing limited-distribution information unless the sender enables one or more of these actions by anyone, or by selected recipients, etc. These restrictions may be enforced by the recipient's device or regulated by an intermediary, e.g., the server 21 if the e-message service is provided by the server 21.

Figure 11:
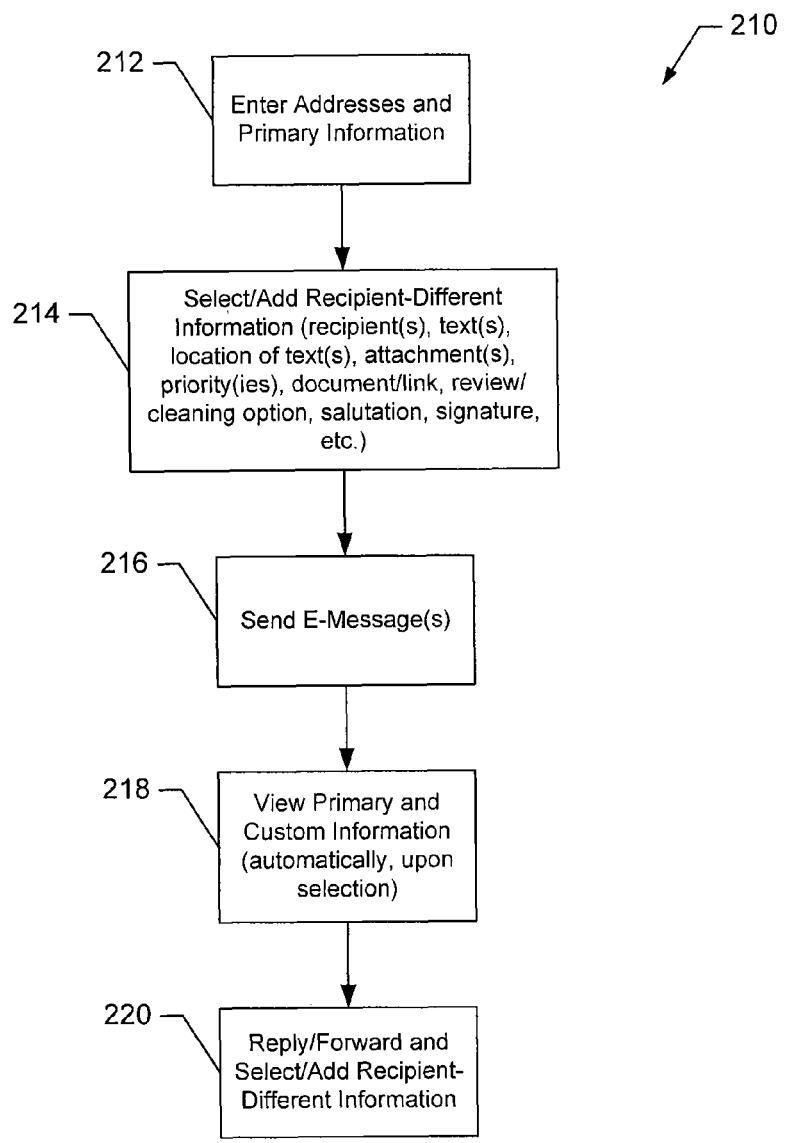
FIG. 11 is a block flow diagram of providing and viewing limited-distribution information of an electronic message.

In operation, referring to FIG. 11, with further reference to FIGS. 1-10, a process 210 for producing, sending, and viewing an electronic message, here an e-mail, using the system 10 includes the stages show. The process 210, however, is exemplary only and not limiting. The process 210 may be altered, e.g., by having stages added, removed, or rearranged. The process 210 can be performed at a computer of an individual user, at a remote server, etc. Thus, the process 210 can be performed for a user either locally, at that user's computer, or through a remote device, e.g., the server 21, accessed by the user.

At stage 212, a "single" e-message is produced. The user enters one or more addresses or intended recipients, e.g., by typing addresses, selecting addressees from menus, etc. The user also adds primary information to be received by all of the intended recipients.

At stage 214, limited-distribution information to the e-message, including substantive content and/or handling settings is added. This information may be added by the user or added automatically by the computer 12. For user-added information, the user selects one or more recipients for receiving particular limited-distribution information and selects the limited-distribution information. The user can select the limited-distribution information first and associate the limited-distribution information with one or more recipients to receive that information. Alternatively, the user may select one or more recipients and then select the limited-distribution information to be associated with those recipients. The limited-distribution information can be selected through, e.g., drop-down menus, browsing through stored information, or entering new information, e.g., into a limited-distribution information text window.

Figure 4:
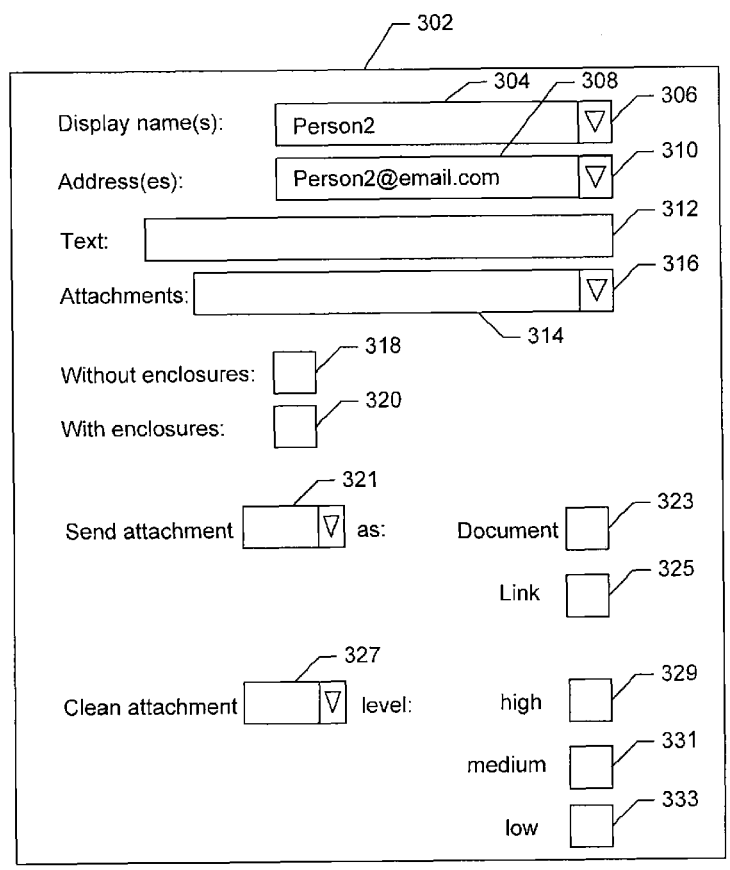
FIG. 4 is a simplified screenshot of a window for insertion/selection of limited-distribution information for an electronic message.

The limited-distribution information can be selected or changed by the user selecting the limited-distribution information icon 82 (FIG. 3) and then being prompted with the limited-distribution information window 302 (FIG. 4). The user enters the prompted-for information in the appropriate portions of the window 302. The user enters or selects the intended recipient(s) for the limited-distribution information and selects or enters the limited-distribution information in the other windows 312, 314. Here, the user can enter new text in window 312 and/or select attachments by entering the attachments in the window 314 or by selecting them using the drop-down menu by selecting the menu icon 316. Addressees may also be designated to receive all or none of the attachments using the with enclosure selector 320 or the without enclosure selector 318, respectively (FIG. 4). The user also selects the desired form of attachments (document or link) and cleaning level, with the values of form and cleaning level defaulted to default selection (e.g., document form and high cleaning level), with the user changing the selections as desired.

Custom information can also be selected using the icons 79, 81. The user selects one or more desired recipients and then selects the desired icon 79, 81 to associate a priority level or delivery status with the selected recipient(s). The priority level or delivery status is set to a default value, but the user may alter this to a desired value using drop-down menus provided by the icons 79, 81.

A location in the display can be selected at which the limited-distribution information is to be provided/displayed to the intended recipient(s) of that limited-distribution information. For example, the user can select a particular location in the primary information of the e-message where the limited-distribution information will be provided. Alternatively, the user may highlight a portion of the primary information and associate the limited-distribution information with this highlighted portion. The limited-distribution information can be viewed by hovering the user's or the recipient's cursor over the highlighted portion of the primary information, which will preferably cause a window to be displayed, e.g., adjacent to the highlighted portion, the window showing the limited-distribution information.

The user can also use the windows 114, 116 (FIG. 7) to select to have limited-distribution information selectively hidden from recipients not receiving the limited-distribution information. The user can select to hide different levels of information, e.g., the existence of the limited-distribution information, the type of limited-distribution information, and/or the name of the limited-distribution information. The user can also select from which recipients to hide this information.

At stage 216, the e-message is sent to the intended recipients. The e-message, or other electronic message, appears as a single outgoing message to the sender of the e-message, i.e., as in the log. The "single" outgoing e-message is split, e.g., by the computer 12 before sending into the multiple different e-messages, e.g., 372, 373, 374, 376, 378. For example, the user's computer 12 may send separate e-messages to a first-hop router in the network 20. The split e-messages may be different, with each e-message having the primary information and any limited-distribution information for that recipient. A split e-message may be further split into multiple "identical" (even though the addressees are different, the e-messages are substantively the same) e-messages if multiple recipients are to receive the same primary and limited-distribution information. The icons in the e-message window 50 can indicate to which intended recipient(s) each of the limited-distribution information will be sent. As shown in FIG. 3, generic limited-distribution information icons appear next to the intended recipients showing what limited-distribution information those recipients will receive. The icons 94, 96, 98, 100, 102, 104, 106 indicate generically that the recipients will receive either text and/or attachments of limited-distribution information. Alternatively, icons may be provided that not only indicate the type of limited-distribution information but the exact limited-distribution information that the corresponding intended recipient will receive (e.g., by filenames). Indicia are provided in the single outgoing message to show restrictions on the limited-distribution information, e.g., which addressees have information regarding limited-distribution information shown to them, and what information is shown or what information is provided.

At stage 218, an intended recipient of the e-message sent by the user receives and views the message. The recipient can view the primary information and limited-distribution information intended for that recipient. The limited-distribution information may be automatically displayed upon opening of the e-message and provided at an appropriate location, e.g., relative to the primary information. For example, limited-distribution information may be displayed in the window 62 near the primary information associated with the limited-distribution information, and/or in an area that has little or no (i.e., is free or substantially free of) primary information, etc. For further example, the user may select, e.g., using a mouse, a location for displaying the limited-distribution information. Alternatively, limited-distribution text may appear at a constant position with respect to the primary information without the user being able to select a particular location, or if the user did not choose to select a particular location at which to display the limited-distribution information. The limited-distribution information may be displayed where the sender chose, e.g., adjacent a selected portion of the primary information to which the limited-distribution information relates.

The limited-distribution information may also, or alternatively, be provided to the intended recipient upon selection by the intended recipient to view the limited-distribution information. For example, the recipient may double click on an icon indicating the limited-distribution information, or hover the recipient's cursor over a highlighted portion of text in the primary information. For further example, the user may right-click the user's mouse when hovering the cursor over a highlighted portion of primary information indicative of limited-distribution information being available and associated with the highlighted primary information. The limited-distribution information could then be chosen to be viewed by the user.

At stage 220, the recipient can process, e.g., reply to, forward, save, copy, or print, the received e-message. The recipient can select and/or add limited-distribution information to a reply or forwarded e-message as desired. The recipient can add or select limited-distribution information using techniques similar to those of the user as described above with respect to stage 214 and hence, the recipient has thus become a sender of a new e-message. The recipient, however, may be inhibited from forwarding, copying, saving, and/or printing some or all of the received limited-distribution information, e.g., if the sender selected to inhibit one or more of the actions. Some or all of the limited-distribution information may be automatically removed after a set amount of time, e.g., if the sender wants to inhibit the recipient from showing other persons the limited-distribution information on the recipient's screen. Thus, the recipient's device can be instructed, as part of the e-message, to delete the limited-distribution information, e.g., after a specified amount of time has past since the limited-distribution information is first displayed on the recipient's device, or after an amount of time that the limited-distribution information has been displayed.

The e-message sent at stage 216 preferably appears as a single e-message to the user in the user's sent e-message box. Thus, the sending user can re-access the sent e-message which appears as a single e-message just as it did when the user created the e-message. The e-message, however, is preferably divided into multiple e-messages each comprising the primary information to be received by all recipients and only the limited-distribution information intended for the particular intended recipient. This division is preferably performed by the sender's computer 12, or the server 21 if the server 21 provides the e-message service to the user. Thus, if different limited-distribution information is to be provided to each of three different recipients, and these three recipients are the only recipients of the e-message, then three separate e-messages will be received by the recipients, one to each of the three recipients. Each of these e-messages will comprise the primary information and only the limited-distribution information selected for that particular recipient. If a further recipient is provided in the e-message but is not to receive limited-distribution information, then a fourth e-message is produced and sent to the other recipient with no limited-distribution information provided with that e-message. If multiple recipients are not to receive the limited-distribution information, then multiple versions of the fourth e-message will be produced, e.g., by the user's device (or possibly in the network 20), as an individual e-message will be provided to each of the other recipients, although the content of these e-messages will be identical.

Other embodiments are within the scope and spirit of the disclosure and the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Further, while separate windows for text and attachments are shown in FIG. 3 indicating that a recipient has additional text and one or more additional attachments, a single window, e.g., an "additional information" window could be used to indicate the presence of additional text, attachments, or any other additional information. In this case, for example, a recipient could select (e.g., mouse click on) the additional information window to cause an additional window to be displayed which would show and/or indicate the additional text and/or additional attachment(s) for the corresponding recipient. Also, messages can be sent with no primary content, but with limited-distribution content. There may be no information that all of the recipients receive.

Figure 13:
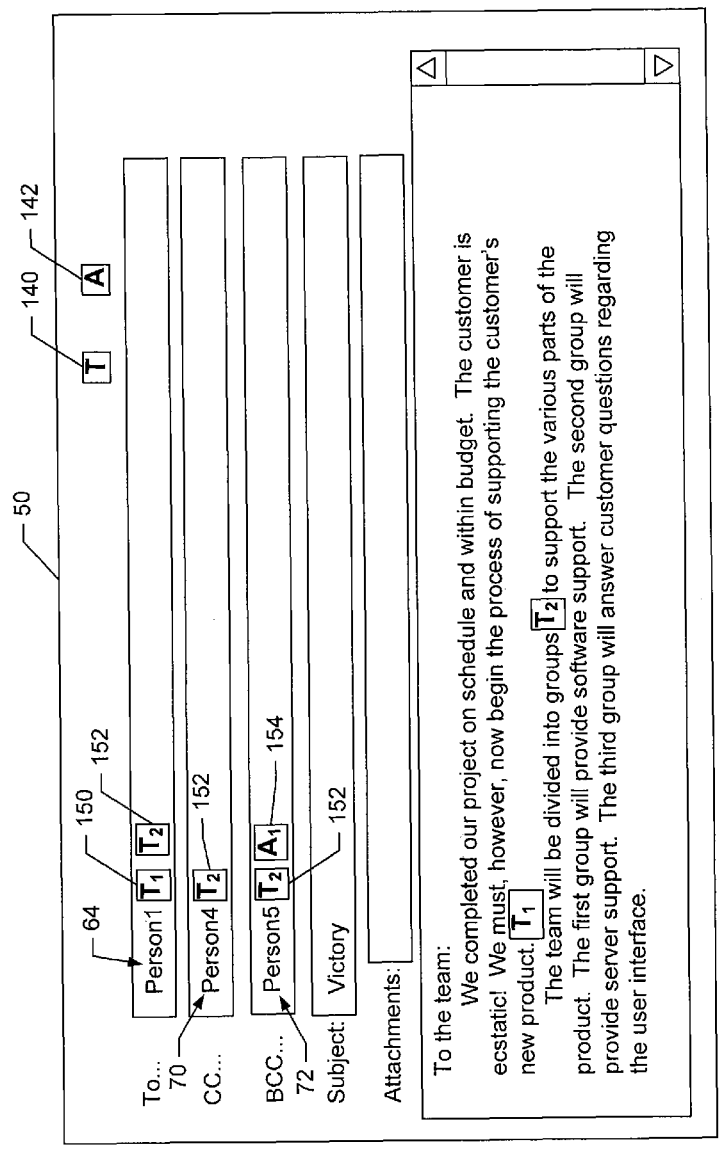
FIG. 13 is a diagram of a user interface for an electronic message indicating different limited-distribution information associated with the electronic message.

Further, different indicators of limited-distribution text and/or limited-distribution attachments may be used. For example, a single text indicator could be displayed for each limited-distribution text message associated with an addressee, and/or a single attachment indicator could be displayed for each limited-distribution attachment associated with an addressee. Limited-distribution text and/or limited-distribution attachment indicators may be unique to the text or attachment, e.g., using subscripts to distinguish different messages or attachments (e.g., $T_1$, $T_2$, etc. and $A_1$, $A_2$, etc.), with identical messages and/or attachments having identical indicators to enable identification of which addressees received which text messages and/or attachments. Referring to FIG. 13, the addressee 64 will be sent limited-distribution text messages 150, 152, with the text message 152 also being sent to the cc addressee 70 and the bcc addressee 72, with the bcc addressee 72 also being sent the attachment 154.

Also, other techniques than limited-distribution information indicators (FIG. 3) can be used to indicate that an electronic message recipient has limited-distribution information. For example, the display name of a recipient for which limited-distribution information has been provided may be in all capital letters, in bold type, in italics, and/or in a color indicative of limited-distribution information (e.g., non-black, such as red or blue).

Figure 12:
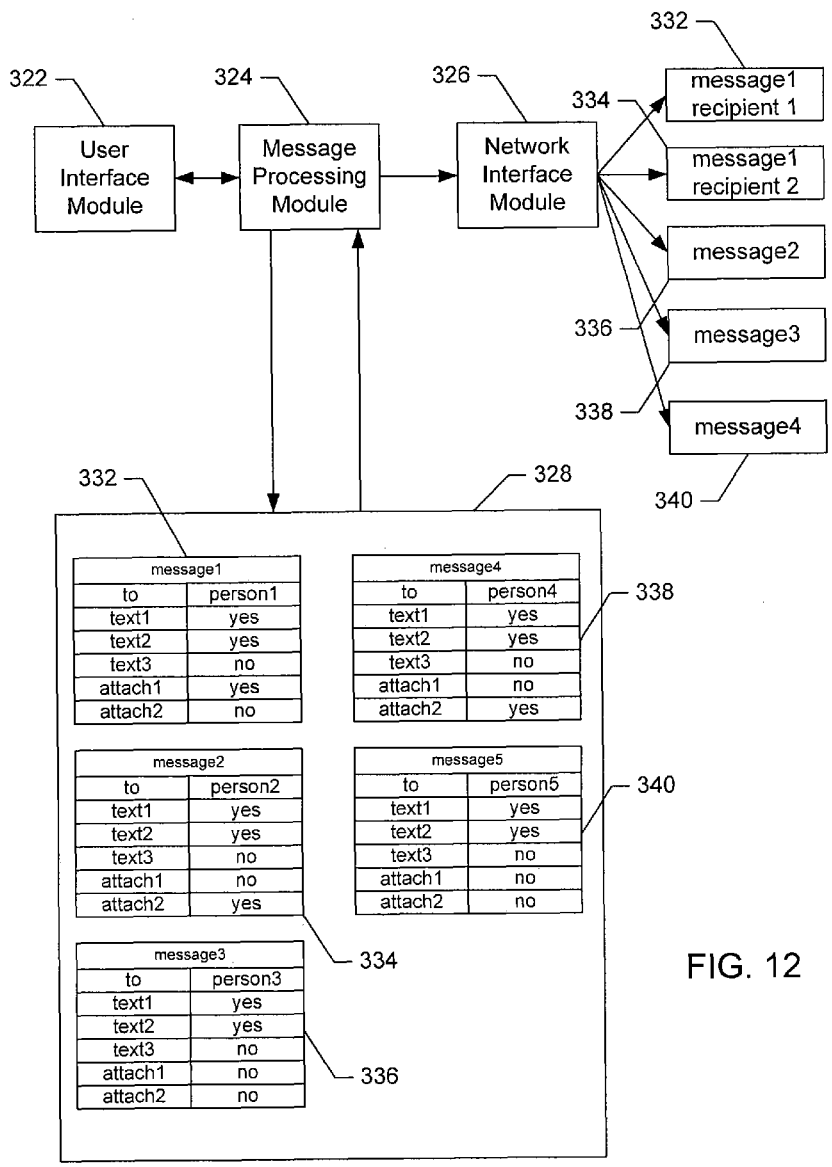
FIG. 12 is a block diagram of alternative components for producing an electronic message with different information for different recipients and sending the electronic messages with different content to the recipients.

Also, other techniques for producing multiple recipient e-messages from a single outgoing e-message may be used. For example, referring to FIGS. 1, 2, and 12, the computer 12 can provide a user interface module 322, a message processing module 324, a message output module 326, and a message storage area 328. The modules 322, 324, 326 are provided, at least partially, by the processor 32, the memory 34, and the display 36 and/or the keyboard 38 and/or the mouse 40, and the storage area 328 is a portion of the memory 34. These modules 322, 324, 326, 328 are configured to receive information from the user, produce e-messages for addressees, and send (or provide access to, in the case of the server 21) the e-messages.

The user interface module 322 is configured to provide prompts to the user and receive information from the user, e.g., via the display 36 and/or the keyboard 38 and/or the mouse 40. Through the module 322 the computer 12 receives indications of universal information and limited-distribution information, and of which addressees are to receive which information.

The message processing module 324 is configured to process the indications regarding e-messages to store one or more e-messages in the module 328. The processing module 324 is configured to store e-message information in the module 328, indicating recipients, universal information, etc. as a single e-message unless an indication of limited-distribution information is received. The processing module 324 is configured to respond to an indication that limited-distribution information is to be provided, i.e., to less than all the addressees, by producing another e-message in the module 328. The module 324 is configured to produce an e-message in the module 328 for each different set of information to be provided to one or more addressees. In the example shown in FIG. 12, five e-messages 332, 334, 336, 338, 340 are produced and stored in the module 328 corresponding to five different sets of information to be provided to one or more addressees for each of the messages 332, 334, 336, 338, 340. Thus, each message 332, 334, 336, 338, 340 contains different information, and may have (as here) a different set of addressees. For example, as shown, the message 332 has addressee person1, has one attachment attach1, and two text sets text1, text 2. The message 334 has addressee person2, attachment attach2, and two text sets text1, text2. The message 336 has addressee person3, no attachments, the text sets text1, text2 (e.g., cc-ed without enclosures). The message 338 has addressee person4 and the same content as the message 334. The message 340 has the same content as the message 336, but with addressee person5.

The message output module 326 is configured to send the e-messages 332, 334, 336, 338, 340 toward the addressees. While five e-messages 332, 334, 336, 338, 340 are shown, other quantities of e-messages are possible. The module 326 is configured to respond to the user selecting to send the e-messages 332, 334, 336, 338, 340 by sending the e-messages 332, 334, 336, 338, 340 to the network 20 in accordance with the addresses of the addressees person1, person2, person3, person4, person5 (or other addressees as the case may be). In the case of the server 21 providing the e-message services, the module 326 would allow access to the appropriate e-message by the corresponding addressee and downloading of that message if desired. The message can be sent, e.g., to a web browser associated with the addressee instead of the address (e.g., e-message address) corresponding to the addressee. The output module 326 is configured to send the same message multiple times in the case of multiple addressees of a single message, e.g., to send the message 334 to the addressee person2 and to the addressee person4 (as the message 338).

Further, different arrangements of limited-distribution information selectors or icons may be used. For example, referring to FIG. 13, as opposed to the single limited-distribution information selector icon 82 shown in FIG. 3, there may be multiple limited-distribution information selector icons, e.g., icons for text 140, attachments 142, etc.

Figure 14:
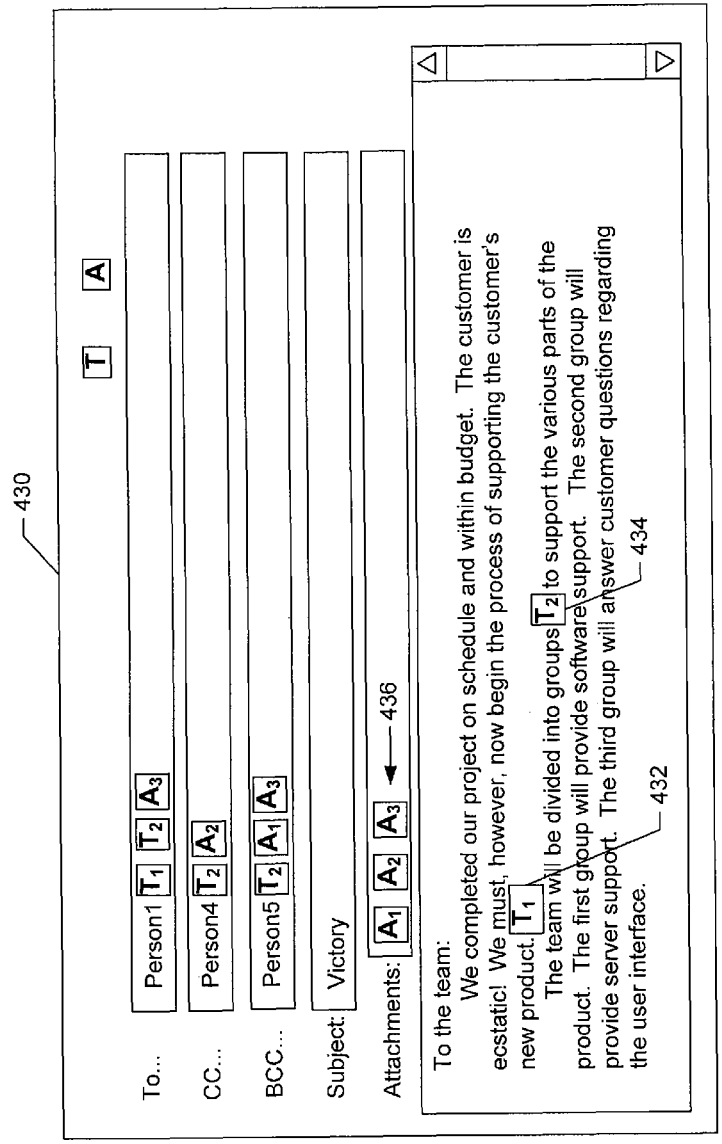
FIG. 14 is a diagram of a user interface for producing an electronic message by dragging and dropping icons representing limited-distribution information.
Figure 15:
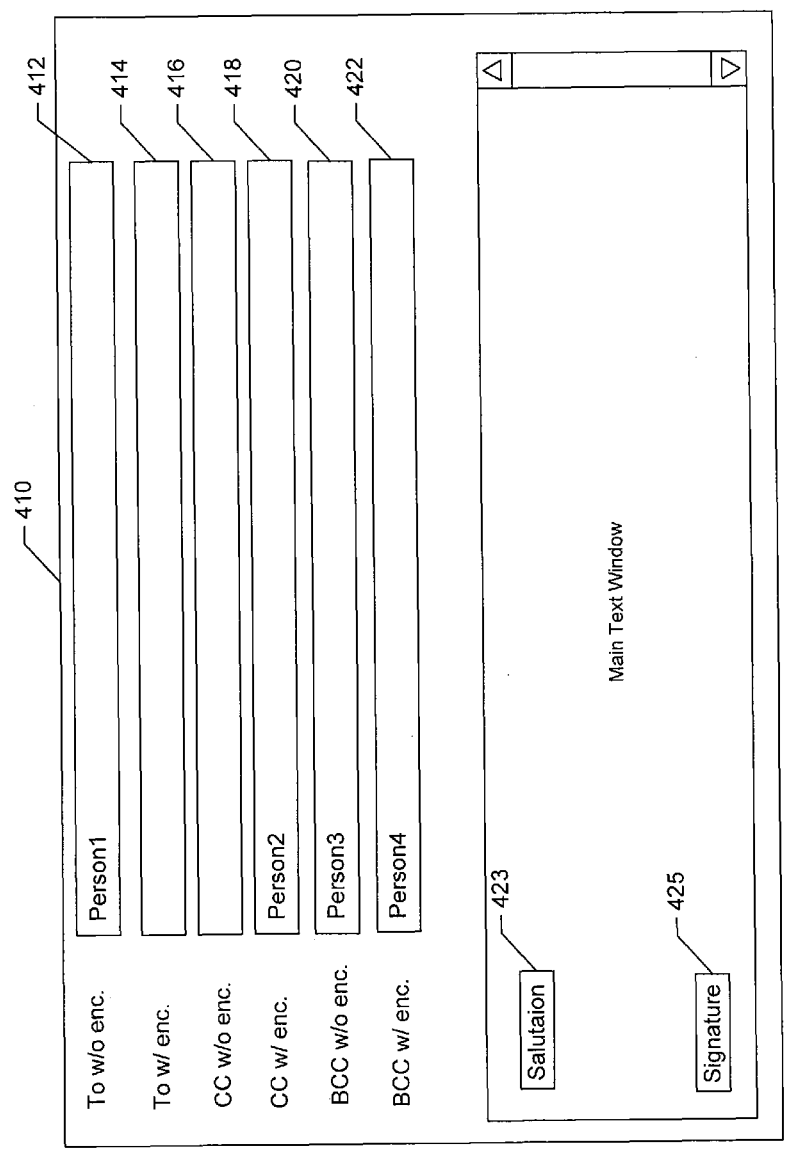
FIG. 15 is a diagram of an alternative user interface for producing an electronic message.

Further, other techniques may be used for associating limited-distribution information with recipients. For example, referring to FIG. 14, limited-distribution information may be associated with an intended recipient through techniques such as dragging and dropping an attachment icon or extra text onto the addressee indicator (e.g., the addressee's e-mail address in the to, cc, or bcc windows). The user may produce custom text 432, 434 and the user can drag and drop the text (or icons, as shown, representing the text) to the various addressees to have the texts 432, 434 associated with the selected (i.e., dragged-to) addressees. The user could left click on a desired attachment or other file icon 436 and while holding down the left mouse button, move the cursor over the intended recipient's e-mail address or name displayed on the computer display and release the left mouse button to thereby associate the selected limited-distribution text with the selected recipient. The user may also be able to "right click" on an addressee. In response to right clicking on the addressee (i.e., moving the cursor over a displayed addressee's name or e-mail address and actuating the right mouse button), a menu may be provided on which an option is to provide limited-distribution information. The user could select the limited-distribution information option from the menu to be prompted for the limited-distribution information to provide to the selected addressee. Alternatively, or additionally, referring to FIG. 15, the user may be presented with, or allowed to choose to be presented with, a TO with-enclosures window 412, a TO without-enclosures window 414, a CC with-enclosures window 416, a CC without-enclosures window 418, a BCC with-enclosures window 420, and/or a BCC without-enclosures window 422. The user can enter addresses into the desired windows 412, 414, 416, 418, 420, 422 and the addressees in the windows 414, 418, 422 will receive none of the enclosures. Enclosures may be associated with the addressees in the windows 412, 416, 420, including having all enclosures so associated, e.g., by selecting the with-enclosures icon 320 (FIG. 4). Alternatively, the addressees in the windows 412, 416, 420 may be defaulted to receive all enclosures automatically.

Also, other techniques may be provided for viewing limited-distribution information by a recipient. For example, the recipient may select to view limited-distribution information, e.g., by left mouse clicking on limited-distribution information icon such as the icons 96 or 104 shown in FIG. 3, or selecting a general limited-distribution information icon that could result in a menu being displayed, and the user selecting a "display limited-distribution information" option. Especially if limited-distribution information is displayed automatically, preferably the limited-distribution information will be displayed in a manner to indicate that it is limited-distribution information or at least not part of the primary message. For example, the limited-distribution information could be highlighted, be of a different color, be in italics or bold, or displayed in another manner to distinguish it from other portions of the e-message. For example, the limited-distribution information may be prefaced with text such as "LIMITED-DISTRIBUTION INFORMATION:". Further, the recipient may be provided with an indication of what other recipients are allowed to view, or receive, the specified limited-distribution information.

Further, limitations may be provided on the usage or manipulation of limited-distribution information by the recipient. As discussed, the recipient of limited-distribution information may be inhibited or prevented from forwarding the limited-distribution information provided to that recipient. Further, the limited-distribution information may also be inhibited or prevented from being included in any reply e-messages. The limited-distribution information may be associated with the initially-selected recipient only (e.g., with the limited-distribution information being sent only to that person). The limited-distribution information may be associated with the particular recipient such that no message can be sent with that limited-distribution information directed to a recipient other than the initially-selected recipient.

Further, while limited-distribution information may be inhibited from being forwarded, a recipient may provide further limited-distribution information, or new limited-distribution information, to recipients of forwarded or replied-to messages. Thus, a recipient of an e-message with or without limited-distribution information may reply to or forward this e-message and provide limited-distribution information to one or more of the recipients of the new e-message using techniques such as those described above, or others.

Still further techniques may be used for producing multiple recipient e-messages from a single outgoing e-message. For example, an outgoing e-message can be split at one or more devices (e.g., routers, gateways) in the network 20 into an e-message for each intended recipient with appropriate limited-distribution information (i.e., the limited-distribution information for the recipient corresponding to the e-message address for each split e-message). The computer may send an e-message to the first-hop router with instructions for which recipient is to receive which information, and the first-hop router and/or one or more downstream routers may split and/or re-split the e-message into multiple e-messages each containing only the limited-distribution information for the intended recipient of the particular e-message.

Limited-distribution information can be automatically provided to different intended recipients. For example, text of a signature block 423 and/or a salutation block 425 (FIG. 15) can be automatically customized for different intended recipients, e.g., such that clients/customers of the sender will receive a formal signature block (e.g., with sender's title and contact information) and salutation (e.g., "Dear Mr. Smith" or "Dear Ms. Smith") while recipients within the sender's company will receive a less formal signature block (e.g., just the sender's first name) and salutation (e.g., "Jim" or "Sue"). Such automatic custom content may not be differentiated relative to other content, i.e., such that a recipient will not be notified that this content is custom content or that other recipients will receive different content.

Recipients of e-messages are device addresses, and not necessarily a person and saying that a recipient takes an action refers to a person using the recipient device.

Further, settings other than those discussed may be customized for recipients. For example, whether a read-reply is requested may be selected manually by a sender or automatically (e.g., as previously selected by the sender or other entity, e.g., based on various recipients or recipient classes (e.g., internal to the sender's company or external to the sender's company)). Further, the text of an automatic reply by a user may be customized for the recipient (e.g., an external recipient may receive "I will be out of the office until December $2^{nd}$ and will return messages at that time," while an internal recipient may receive "I will be out of the office until December $2^{nd}$," and while a select few (e.g., very important persons) may receive "I am currently out of the office, but will return your message as soon as possible," with the messages from this latter class being forwarded to the user, e.g., to the user's personal digital assistant).

Also, other techniques than those discussed may be used for selecting different handling settings. For example, a single handling settings icon may be provided, e.g., in the window 50, and a window similar to the window 302 shown in FIG. 4 provided in response to selection of the handling settings icon. This window, however, would provide the user with the ability to select handling settings for the selected recipient(s), e.g., the priority, the delivery status, and the review/cleaning level. Alternatively, the window 302 could be modified to provide the ability to select handling settings for the selected recipient(s) in addition to the review/cleaning level that the window 302 allows the user to select. Further, a review/cleaning icon 77 (shown in dashed lines in FIG. 3) can be provided in the window 50 and used in a similar manner to the icon 79 to choose review/cleaning settings for the selected recipient(s).

As mentioned, the server 21 may provide functionality related to e-messages. For example, the modules shown in FIG. 6 and discussed above may be provided in the server 21, with the user interface module being configured to communicate over a communications network, e.g., with the computer 12, to provide the user interface to the user, and to receive indications of the user's input to the interface.

Still other embodiments are within the scope of the disclosure.

What is claimed is:

1. A method of producing and sending an e-message, the method comprising:
    receiving addressee instructions from a sender for a single sender e-message indicating addresses of first and second intended destinations of at least portions of content of the single sender e-message;
    associating a first content portion of the single e-message with the first intended destination, the first content portion being intended to be received by the first intended destination;
    automatically associating at least one of a text portion of the e-message, an attachment, or a handling setting with the first intended destination based on a redetermined association for the first intended destination; and
    sending the first content portion toward the first intended destination in a destination e-message such that the first content portion is accessible at the first intended destination and is inhibited from being accessed at the second intended destination, the destination e-message at least one of having the handling setting or including the at least on of the text portion of the e-message or the attachment.

2. The method of claim 1 wherein sending the first content comprises sending the first content portion toward the first intended destination but not toward the second intended destination.

3. The method of claim 1 wherein receiving the addressee instructions comprises receiving the addressee instructions via a packet-switched telecommunications network.

4. The method of claim 1 further comprising:
    receiving a second content portion to be delivered to each of the first and second intended destinations; and
    sending the second content portion toward the first and second intended destinations;
    wherein the second content portion is sent in conjunction with the first content portion toward the first intended destination in the destination e-message.

5. The method of claim 4 further comprising:
    displaying an additional-content indicator at the first intended destination; and
    displaying the first content portion at the first intended destination only if a user of the first intended destination selects to have the first content portion displayed.

6. The method of claim 5 wherein the additional-content indicator is displayed at a location, on a display, selected by the sender relative to the first content.

7. The method of claim 1 wherein the first content is provided in response to input by a sender, the method further comprising automatically displaying the first content portion at the first intended destination such that the first content portion is visually distinct from second content portion by altering an appearance of the first content beyond input from the sender.

8. The method of claim 1 further comprising displaying the first content portion at the first intended destination in response to a cursor being moved over a region of the destination e-message indicating that additional information is associated with the region.

9. A computer program product configured to send electronic communications to multiple recipients, the computer program product residing on a computer readable medium and comprising non-transitory computer readable instructions configured to cause a computer to:
    receive addressee instructions in a single-view outgoing e-message indicating first and second addresses of first and second different intended recipients of first and second outgoing e-messages, respectively, the first and second outgoing e-messages being related to the single-view outgoing e-message;
    associate first and second information, respectively, with the first and second outgoing e-messages to be provided to the different intended recipients, the first and second information being different in addition to containing different addresses of the first and second outgoing e-messages, the first and second information being different in substantive content and/or a handling setting; and send the first outgoing e-message toward the first intended recipient and the second outgoing e-message toward the second intended recipient;

wherein the instructions for causing the computer to associate the first and second information cause the computer to associate different substantive content and/or different handling settings with the first and second outgoing e-messages automatically in response to the first address and/or the second address, the different substantive content including information other than the first and second addresses.

10. The computer program product of claim 9 wherein the substantive content comprises an attachment and wherein the instructions configured to cause the computer to associate the first and second information cause the computer to associate a document with the first outgoing e-message and to associate a link to the document with the second outgoing e-message based on the first and second addresses.

11. The computer program product of claim 9 wherein the substantive content comprises text and wherein the instructions configured to cause the computer to associate the first and second information cause the computer to associate first and second signature block information, different from each other, and/or first and second salutation block information, different from each other, with the first and second outgoing e-messages based on the first and second addresses.

12. A method of producing and sending different e-messages to different recipients, the method comprising:

receiving indications, via a single-view e-message interface of a single-view outgoing e-message, of first and second addresses of first and second different intended recipients of first and second outgoing e-messages, respectively, the first and second outgoing e-messages being related to the single-view outgoing e-message;

associating first and second information, respectively, with the first and second outgoing e-messages to be provided to the different intended recipients, the first and second information being different in addition to containing different addresses of the first and second outgoing e-messages, the first and second information being different in substantive content and/or a handling setting, the substantive content being information in addition to the first and second addresses; and sending the first outgoing e-message toward the first intended recipient and the second outgoing e-message toward the second intended recipient;

wherein the associating comprises associating the different substantive content and/or handling setting with the first and second outgoing e-messages automatically in response to the first address and/or the second address.

13. The method of claim 12 wherein the substantive content comprises an attachment and wherein the associating comprises associating a document with the first outgoing e-message and associating a link to the document with the second outgoing e-message based on the first and second addresses.

14. The method of claim 12 wherein the substantive content comprises text in a body of the e-message and wherein the associating the first and second information comprises associating first and second signature block information, different from each other, with the first and second outgoing e-messages based on the first and second addresses.

15. The method of claim 12 wherein the handling setting comprises a priority and/or a read notification request and/or a delivery notification request and/or a cleaning level.

16. An apparatus comprising:

a user interface module configured to provide information for a user interface to prompt a user to enter primary e-message information into a single-view e-message for different recipients with different substantive content and/or handling settings, the user interface module being further configured to receive indications of the e-message information including different message addresses respectively associated with the different recipients;

a message processing module coupled to the user interface module and configured to receive the primary e-message information and to produce multiple secondary e-messages from the primary e-message information and to output the multiple secondary e-messages; and a network interface module coupled to the message processing module and configured to receive the multiple secondary e-messages from the message processing module and to send the multiple secondary e-messages to a communication network toward different recipients associated with the multiple secondary e-messages;

wherein the message processing module is configured to associate at least a portion of the different substantive content and/or at least one of the handling settings with the secondary e-messages automatically based on at least one of the message addresses, the different substantive content including information other than the message addresses.

17. The apparatus of claim 16 wherein the user interface module is configured to communicate with the communication network, to provide the information for the user interface to the network, and to receive the indications of the e-message information from the communication network.

18. The apparatus of claim 17 wherein the message processing module is configured to selectively disable recipients of the secondary e-messages from at least one of printing, copying, or forwarding at least portions of the secondary e-messages respectively received.

* * * * *